United States Patent
Michio

(10) Patent No.: US 8,370,900 B2
(45) Date of Patent: Feb. 5, 2013

(54) IMAGE FORMING APPARATUS

(75) Inventor: Shimura Michio, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 12/036,547

(22) Filed: Feb. 25, 2008

(65) Prior Publication Data

US 2008/0209519 A1 Aug. 28, 2008

(30) Foreign Application Priority Data

Feb. 27, 2007 (KR) .................. 10-2007-0019576

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................................... 726/3
(58) Field of Classification Search .................. 726/3
See application file for complete search history.

(56) References Cited

U.S. PATENT DOCUMENTS

| | | | |
|---|---|---|---|
| 7,032,813 B2* | 4/2006 | Mizuguchi | 235/375 |
| 7,746,488 B2* | 6/2010 | Ahn | 358/1.14 |
| 2003/0080181 A1* | 5/2003 | Mizuguchi | 235/375 |
| 2003/0210424 A1* | 11/2003 | Sandfort et al. | 358/1.15 |
| 2005/0088680 A1* | 4/2005 | Ahn | 358/1.14 |
| 2008/0130882 A1* | 6/2008 | Hagglund et al. | 380/51 |
| 2009/0262382 A1* | 10/2009 | Nobutani | 358/1.15 |
| 2010/0023770 A1* | 1/2010 | Partelow et al. | 713/171 |
| 2010/0165993 A1* | 7/2010 | Basilier | 370/395.53 |

FOREIGN PATENT DOCUMENTS

| | | |
|---|---|---|
| CN | 1612099 | 5/2005 |
| KR | 2002-24231 | 3/2002 |

\* cited by examiner

*Primary Examiner* — Kambiz Zand
*Assistant Examiner* — Benjamin Kaplan
(74) *Attorney, Agent, or Firm* — Stanzione & Kim, LLP

(57) ABSTRACT

An image forming apparatus. The image forming apparatus performs security management functions such as security transmission and security printing of data stored in a hard disk of the image forming apparatus and shared with a plurality of host computers through a network, to which a security tag is added for the security of the data so as to increase the security of the data. The image forming apparatus is connected to the network to be shared with the host computers to receive and store data transmitted from the host computers, and includes a storage device to store IP address information of a host computer which transmitted data and security data to which a security tag is added for the security of the transmitted data corresponding to the IP address information, and an image forming controller to perform security management function of the security data.

23 Claims, 6 Drawing Sheets

IMAGE FORMING APPARATUS

CROSS-REFERENCE TO RELATED APPLICATIONS

This application claims the benefit of Korean Patent Application No. 2007-19576, filed on Feb. 27, 2007, in the Korean Intellectual Property Office, the disclosure of which is incorporated herein by reference in its entirety.

BACKGROUND OF THE INVENTION

1. Field of the Invention

The present general inventive concept relates to an image forming apparatus, and more particularly, to an image forming apparatus to perform security management of data.

2. Description of the Related Art

Generally, a printer is an apparatus to print data transmitted from a computer or a scanner on a printing medium which typically is printing paper.

Recently, a mass storage device, such as a hard disk drive (hereinafter referred to as "HDD"), is installed in or is connected to the image forming apparatus to store data designated by a user to be printed. The data may be printed or deleted by a control panel of the image forming apparatus or a host computer if necessary.

Generally, the image forming apparatus is shared by several host computers through a network, such as in an office, such that many users can commonly use the image forming apparatus.

Since the image forming apparatus is used by many users through the network in an office and in other places, all the users can access data stored in the HDD of the same image forming apparatus without restriction. In other words, since items related to a user's privacy or security are exposed to many unknown persons, the conventional image forming apparatus has a security flaw such that information that should be secure is easily exposed to these unknown people.

SUMMARY OF THE INVENTION

The present general inventive concept provides an image forming apparatus to improve the security of data stored in a hard disk of the image forming apparatus which is shared by a network.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image forming apparatus connected to a network to be shared by a plurality of host computers to receive and store data which is transmitted from any of the host computers, the image forming apparatus including a storage device to store security data and IP address information of a host computer which transmits the security data, the security data having a security tag to provide security to the transmitted data corresponding to the IP address information, and an image forming controller to perform security management of the security data.

The security tag may be added to the transmitted data by the host computer.

The security tag may be added to the transmitted data by the image forming apparatus.

The image forming apparatus may further include a security setting unit to add the security tag to the transmitted data.

The image forming controller, wherein when the security data is requested to be transmitted, it may compare IP address information corresponding to the security data requested to be transmitted with IP address information of a host computer requesting the transmission, it may allow the transmission of the security data when the IP addresses match, and it may prohibit the transmission of the security data when the IP addresses do not match.

The image forming controller, wherein when the security data is requested to be deleted, it may compare IP address information corresponding to the security data requested to be deleted with IP address information of a host computer requesting the deletion, it may delete the security data from the storage device when the IP addresses match, and it may prohibit the deletion of the security data when the IP addresses do not match.

The image forming controller may print the security data requested to be printed together with the IP address information when the security data is requested to be printed.

The image forming controller may print the secure data together with a value of a security tag when the security data is printed.

The value of the security tag may have a unique binary value according to a security level.

The foregoing and/or other aspects and utilities of the present general inventive concept may be achieved by providing an image forming apparatus in communication with a plurality of host computers through a network including a storage to store control programs to control the image forming apparatus IP Address information of each of the plurality of host computers and data transmitted by each of the plurality of host computers, a security setting unit to create security data by adding a security tag to the transmitted data, and an image forming controller to receive the data and the IP address information of the host computers and to store the data and the IP address information in the storage and to manage the stored data when a request is received from a host computer based on a comparison of an IP address information of the requesting host computer and the IP address information stored which is associated with the particular data requested to be managed.

The security tag may be added in response to a security setting command input by a user on an input unit of one of the plurality of host computers.

When a request to delete particular data is received from a host computer, the image forming controller may manage the stored data such that the stored data is deleted only if the IP address information of the requesting host computer matches an IP address information stored which is associated with the particular data to be deleted.

When a request to print particular data is received from a host computer the image forming controller may manage the stored data such that the stored data is printed only if the IP address information of the requesting host computer matches an IP address information stored which is associated with the particular data to be printed.

When a request to transmit particular data thereto is received_from a host computer, the image forming controller may manage the stored data such that the stored data is transmitted only if the IP address information of the requesting host computer matches an IP address information stored which is associated with the particular data to be transmitted.

The foregoing and/or other aspects and utilities of the present general inventive concept may be achieved by providing a method of creating securing print data for an image forming apparatus, including transmitting print data from a host computer to the image forming apparatus, storing the transmitted print data, and associating security information with the stored print data, wherein the associated security information includes an IP address of the host computer.

The method may include printing the stored print data with the associated security information.

The method may include deleting the stored print data and the associated security information.

The associated security information may include a security tag associated with the IP address.

The host computer and the image forming apparatus may be connected through a network.

The print data may be printed in a data area of a printing medium and the associated security information may be printed in a security area of the printing medium.

BRIEF DESCRIPTION OF THE DRAWINGS

These and/or other aspects and utilities of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
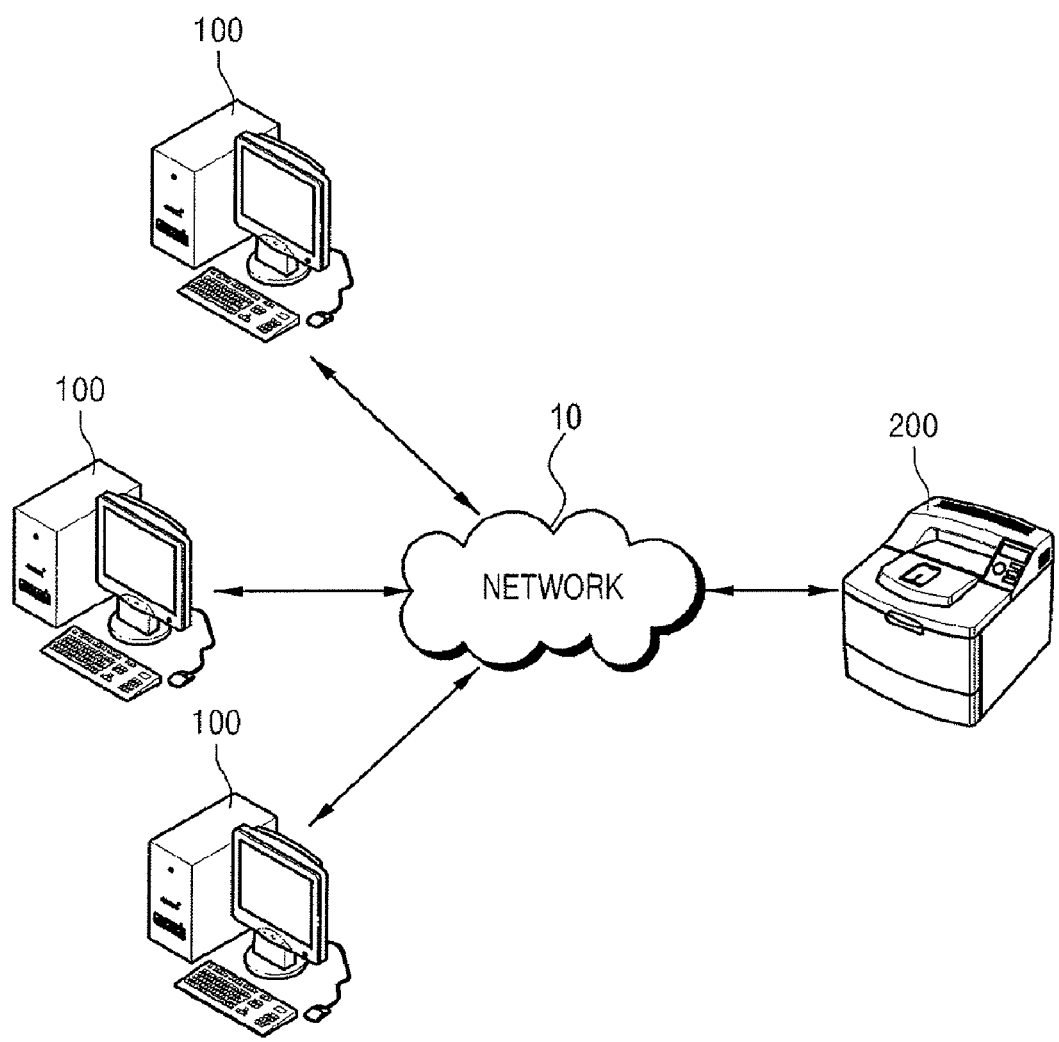
FIG. 1 is a schematic view illustrating a network printer having an image forming apparatus according to an embodiment of the present general inventive concept.

Reference will now be made in detail to an image forming apparatus according to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic view illustrating a network printer having an image forming apparatus 200 according an embodiment of the present general inventive concept. Referring to FIG. 1, the network printer includes a plurality of host computers 100, and an image forming apparatus 200 connected through a network 10 to the host computers 100 which share the image forming apparatus 200 through the network 10. The image forming apparatus 200 is connected to the network 10 to which the respective host computers 100 are connected by a network cable such that the image forming apparatus 200 can perform a corresponding operation according to commands from the host computers 100.

Figure 2:
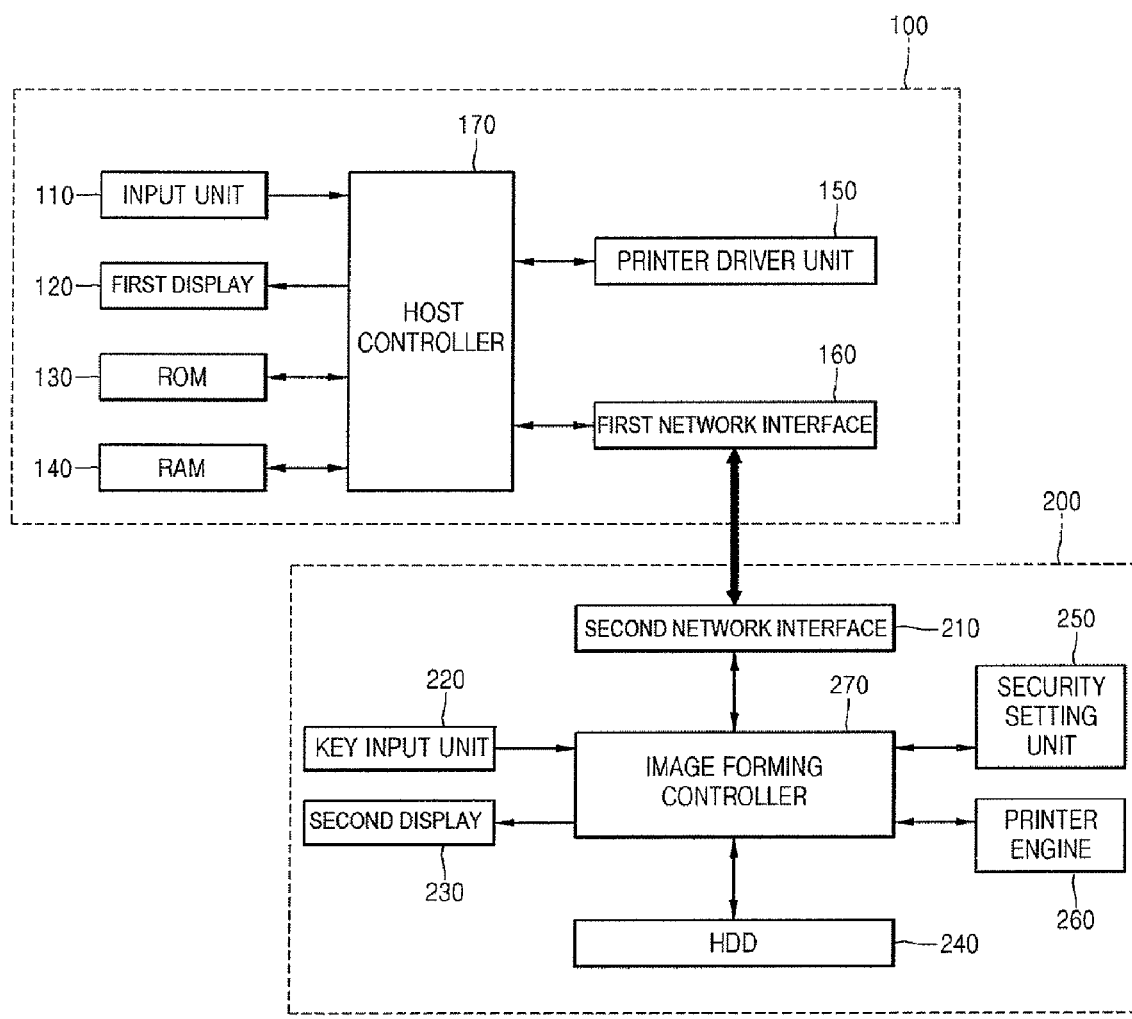
FIG. 2 is a block diagram illustrating a control process of the image forming apparatus according to an embodiment of the present general inventive concept.

Firstly, various embodiments of the respective host computers 100 will be described with reference to FIG. 2. Each of the host computers 100 includes an input unit 110, a first display 120, a read only memory (ROM) 130, a random access memory (RAM) 140, a printer driver unit 150, a first network interface 160, and a host controller 170.

The input unit 110 is a type of user interface, and a user can set several functions assisted by the host computer 100 through the input unit 110. Included in the input unit 110 are a keyboard, a mouse, and the like (not illustrated), and the user manipulates the keyboard and/or the mouse to input various commands to the host computer 100. The various inputted commands are delivered to the host controller 170, described below, r via a system bus.

The first display 120 is also a type of user interface, and the user can view information about various programs operated in the host computer 100 through text and graphics displayed on the first display 120. Included in the first display 120 are a cathode ray tub (CRT), a liquid crystal display (LCD), and the like (not illustrated), and the user refers to a graphic user interface (GUI) window (not illustrated) displayed on the first display 120 to view the operational state of a program.

The ROM 130 is a nonvolatile memory in which the stored contents remain valid even when power to the host computer 100 is interrupted. The ROM 130 stores a control program such as an operating system (OS) required to implement functions of the host computer 100 and other various applications.

The RAM 140 is a volatile memory to store various data created during the performance of the programs.

The printer driver unit 150 drives a printer driver controlling the printing of the image forming apparatus 200 to convert a document file created by the application into print data.

The first network interface 160 implements an interface with the image forming apparatus 200.

In operation, the host controller 170 reads the control program out of the ROM 130 to control the host computer 100. Moreover, the host controller 170 performs various functions with the application which the user wants to implement, and stores data created during the performance of the application, such as a word processing program, in the RAM 140. In addition, the host controller 170 controls the printer driver unit 150 to control the printer driver.

Next, the configuration of the image forming apparatus 200 will be described in detail with reference to FIG. 2. The image forming apparatus 200 includes a second network interface 210, a key input unit 220, a second display 230, a hard disk drive (HDD) 240, a security setting unit 250, a printer engine 260, and an image forming controller 270.

The second network interface 210 is implemented by a network card, and is connected to the network to which the host computer 100 is connected by the network cable to perform data communication between the host computer 100 and the image forming apparatus 200.

The key input unit 220 enables a user to manipulate keys to control the image forming apparatus 200. Particularly, the key input unit 220 receives a menu, relating the security setting of the data stored in the HDD, selected by the user, and provides an input function for the selected menu.

The second display 230 displays the status of the image forming apparatus 200 and information for the security setting on second display 230.

The HDD 240 is a mass storage device which stores data transmitted from the second network interface 210 and various control programs which control the image forming apparatus 200. In this case, internet protocol (IP) address information of the host computer 100 that is used to transmit the data is stored in the HDD 240 to correspond to the stored data. The HDD 240 may be an internal hard disk or an external hard disk.

The security setting unit 250 creates security data by adding a security tag to a recording area of the data to protect the data, stored in the HDD 240. The security tag contains transmission prohibiting information, preventing transmission of corresponding data to a non-authorized host computer and security level information indicating a security level. The security data created by the security setting unit 250 is stored in the HDD 240.

The printer engine 260 prints data stored in the HDD 240 on the printing medium under the control of the image forming controller 270.

The image forming controller 270 receives data transmitted from respective host computers 100 through the second network interface unit 210 and stores the received data in the HDD 240 together with corresponding IP address of the host computer 100 which sends the data. In this case, the image forming controller 270 performs the security setting for the data stored in the HDD 240 through the security setting unit 250 according to a security setting command inputted by the user. In other words, the security data is created by adding a security tag to the data stored in the HDD 240 and the created security data is stored in the HDD 240.

Figure 3:
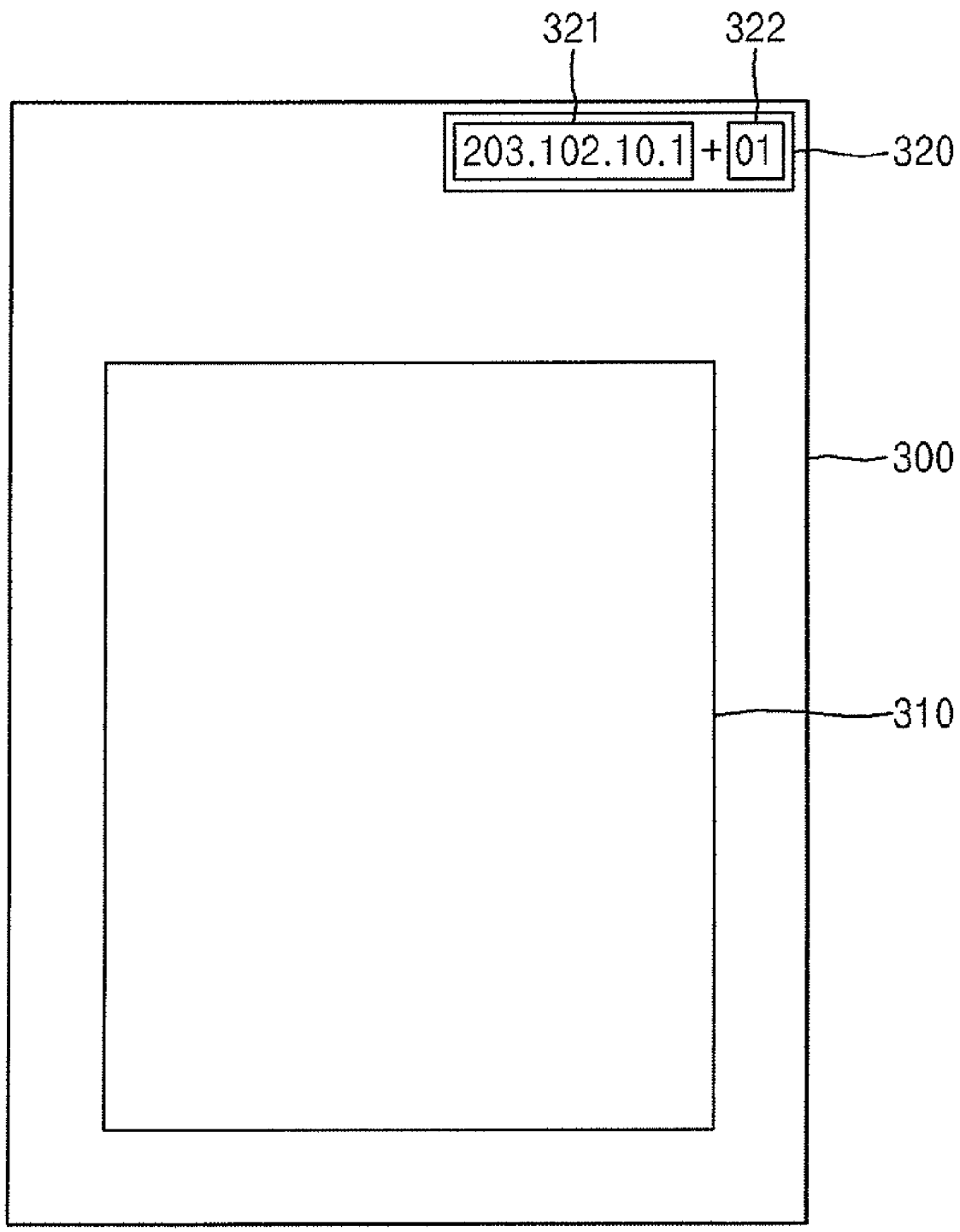
FIG. 3 is a view illustrating a printing medium having been security-printed by the control process illustrated in FIG. 2.

Moreover, the image forming controller 270 performs the security printing of the security data stored in the HDD 240 by the printer engine 260 according to a printing command inputted by the user. In other words, as illustrated in FIG. 3, when the security data is printed in a data area 310 of the printing medium 300, the IP address 321 of the host computer 100 corresponding to the security data and the security tag 322 are also printed in a security area 320 of the printing medium 300. In this embodiment, a value of the security data is a 2-digit binary value such as "01", "10", and "11" indicating a security level of the data. For example, the security levels may be set in the order of "01"<"10"<"11", and vise versa, or any other scheme using any number of digits which achieve the purposes of the general inventive concept as described herein.

Moreover, the image forming controller 270 performs a function of transmitting the security data stored in the HDD 240 to a corresponding host computer 100 according to a transmission command of the corresponding host computer 100. This security transmitting function allows a data transmission to only a host computer 100 having an IP address corresponding to the security data to be transmitted, and prohibits a data transmission to other non-authorized host computers 100 which do not have the IP address associated with the security data.

Figure 4:
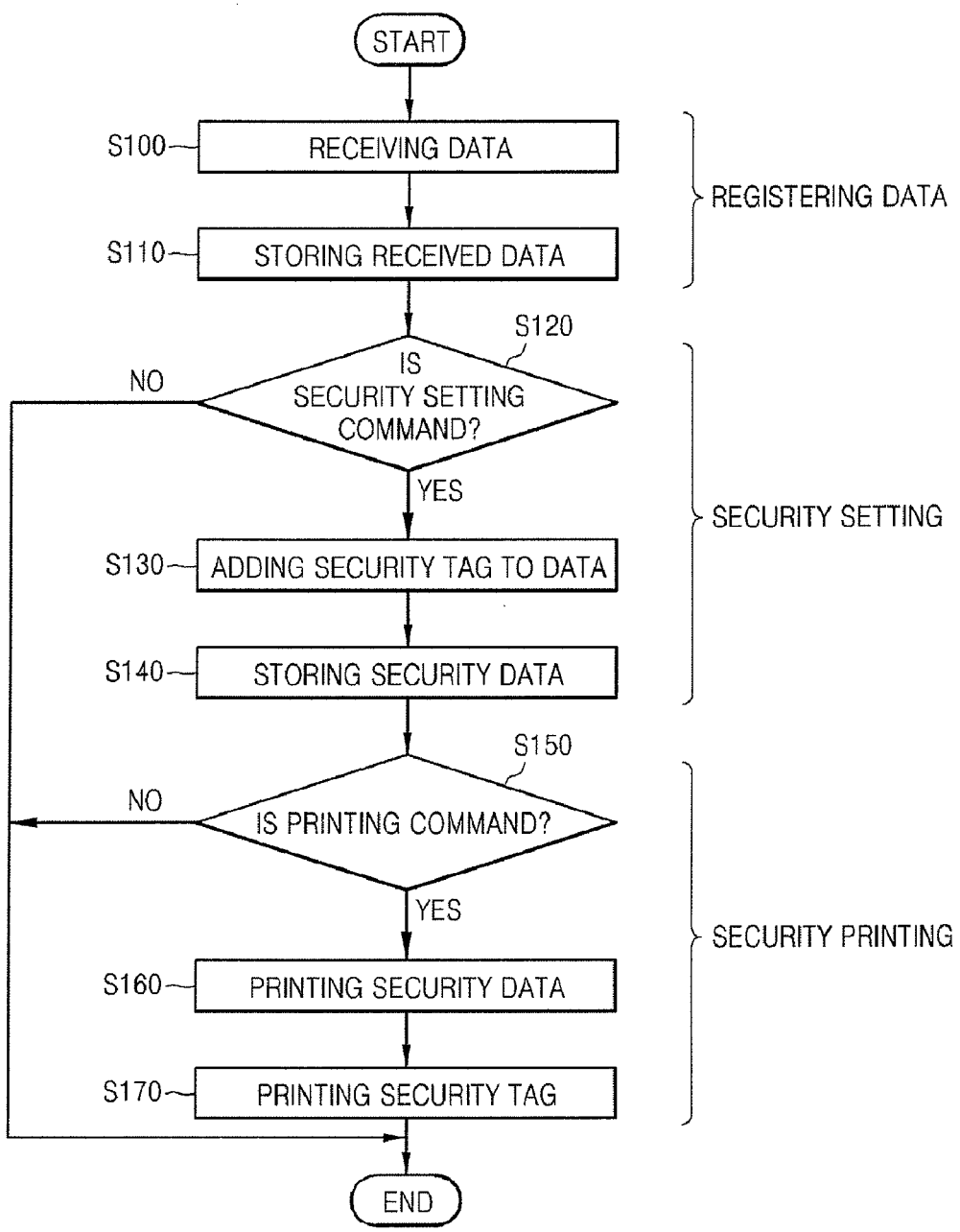
FIG. 4 is a flowchart illustrating a security setting process and a security printing process of the image forming apparatus according to an embodiment of the present general inventive concept.

FIG. 4 is a flowchart illustrating the security setting process and the security printing process of the image forming apparatus according to an embodiment of the present general inventive concept. Referring to FIGS. 2 and 4, firstly, the image forming controller 270 receives the data transmitted from respective host computers 100 through the second network interface unit 210 and stores the received data in the HDD 240 together with the associated IP address information (operations S100 and S110).

In the security setting process, if a security setting command for the corresponding data among the data stored in the HDD is inputted by the user, the image forming controller 270 adds a security tag to the corresponding data stored in the HDD 240 through the security setting unit 250 to create the security data, and stores the security data in the HDD 240 (operations S120 to S140).

In the security printing process, when the printing command for the security data store in the HDD 240 is inputted, the image forming controller 270 performs the security printing by printing the security data in the data area of the printing medium and the IP address 321 and the security tag 322 of the corresponding host computer 100 in the security area 320 of the printing medium (refer to FIG. 3) with the printer engine 260 (operations S150 to S170).

Figure 5:
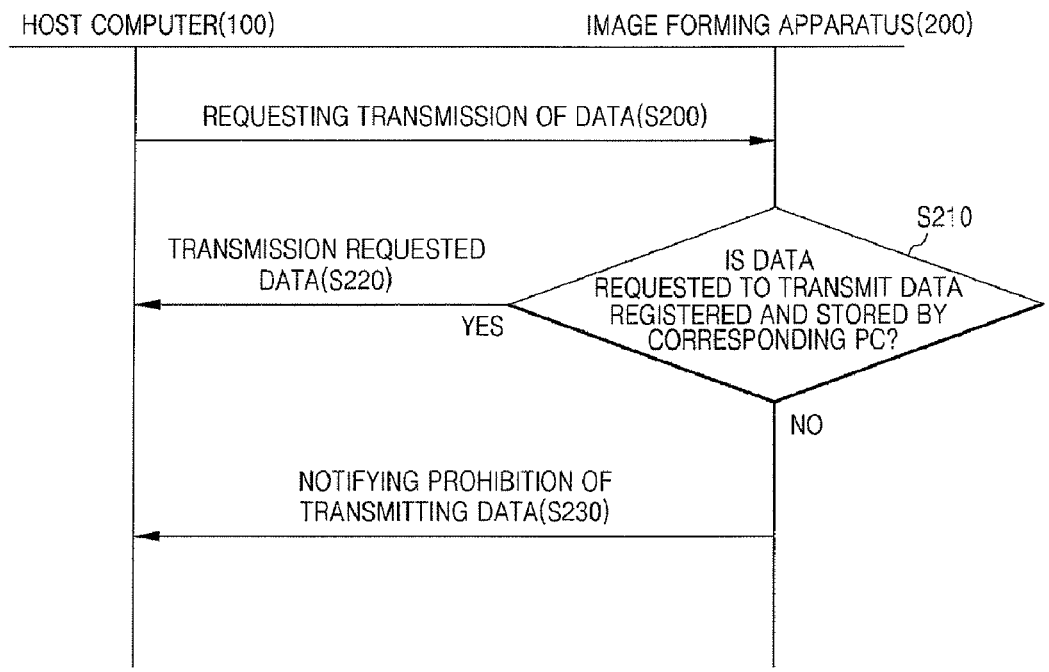
FIG. 5 is a flowchart illustrating a transmission of security data stored in a hard disk of the image forming apparatus according to an embodiment of the present general inventive concept.

FIG. 5 is a flowchart illustrating the transmission process for the security data stored in the HDD of the image forming apparatus according to an embodiment of the present general inventive concept. Referring to FIG. 5, when the host computer 100 requests the transmission of data (operation S200), the image forming apparatus 200 determines whether the requested data is registered and stored in the HDD by the corresponding host computer 100 by comparing the IP address of the host computer 100 requesting the data with the IP address of the host computer 100 associated with the registered stored data (operation S210). If the IP addresses match, the image forming apparatus 200 transmits the requested data to the corresponding host computer 100 (operation S200). If the IP addresses do not match and the requested data is not that which is registered and stored in the HDD 240 by the corresponding host computer 100, the image forming apparatus 200 prohibits the transmission of the requested data and notifies the fact that the data cannot be transmitted to the corresponding host computer 100 (operation S230) by sending a message to first display 120 to notify the user.

Figure 6:
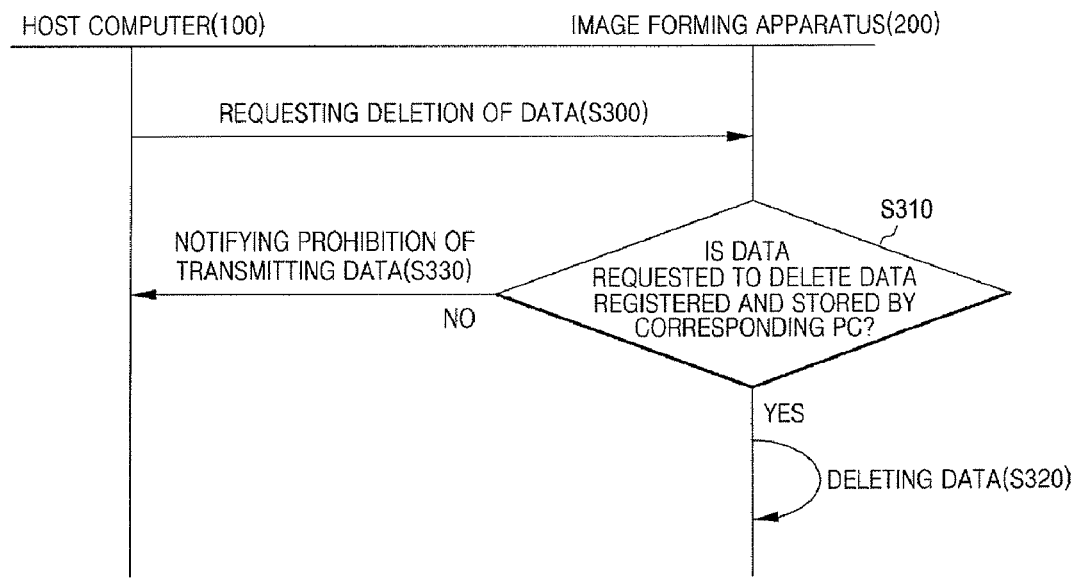
FIG. 6 is a flowchart illustrating a process to delete the security data stored in the hard disk of the image forming apparatus according to an embodiment of the present general inventive concept.

FIG. 6 is a flowchart illustrating a process of deleting the security data stored in the HDD 240 of the image forming apparatus 200 according to an embodiment of the present general inventive concept. Referring to FIG. 6, when the host computer 100 requests that data be deleted (operation S300), the image forming apparatus 200 determines whether the data requested to be deleted is registered and stored in the HDD 240 by the corresponding host computer 100 by comparing the IP address of the host computer 100 requesting that the data be deleted with the IP address of the host computer 100 associated with the registered stored data (operation S310). If the IP addresses match and the requested deletion data is data registered and stored in the HDD 240 by the corresponding host computer 100, the image forming apparatus 200 deletes the data requested to be deleted from the HDD 240 (operation S320). If the IP addresses do not match and the requested deletion data is not data registered and stored in the HDD 240 by the corresponding host computer 100, the image forming apparatus 200 prohibits the deletion of the requested data and notifies the fact that the requested data cannot be deleted to the corresponding host computer (operation S330) by sending a message to first display 120 to notify the user.

As described above, according to the present general inventive concept, a security management process having security data transmission, security data printing, and the like is performed with respect to data to which a security tag is added to security data which is stored on a hard disk installed in an image forming apparatus, or externally connected thereto, and shared by a plurality of host computers through a network, so that security of the data can be increased.

Although a few embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An image forming apparatus connected to a network to be shared by a plurality of host computers to receive and store data which is transmitted from any of the host computers, comprising:

device configured to store security data and IP address information of a host computer which transmits the security data, the security data having a security tag to provide security to the transmitted data corresponding to the IP address information, wherein the security tag includes transmission prohibiting information, preventing transmission of corresponding data to a non-authorized host computer and security level information indicating a security level; and an image forming controller configured to perform security management of the security data.

2. The image forming apparatus of claim 1, wherein the security tag is added to the transmitted data by the host computer.

3. The image forming apparatus of claim 1, wherein the security tag is added to the transmitted data by the image forming apparatus.

4. The image forming apparatus of claim 3, further comprising a security setting unit to add the security tag to the transmitted data.

5. The image forming apparatus of claim 1, wherein the image forming controller, when the security data is requested to be transmitted, compares IP address information corresponding to the security data requested to be transmitted with IP address information of a host computer requesting the transmission, allows the transmission of the security data when the IP addresses match, and prohibits the transmission of the security data when the IP addresses do not match.

6. The image forming apparatus of claim 1, wherein the image forming controller, when the security data is requested to be deleted, compares IP address information corresponding to the security data requested to be deleted with IP address information of a host computer requesting the deletion, deletes the security data from the storage device when the IP addresses match, and prohibits the deletion of the security data when the IP addresses do not match.

7. The image forming apparatus of claim 1, wherein the image forming controller prints the security data and the IP address information when the security data is requested to be printed.

8. The image forming apparatus of claim 7, wherein the image forming controller prints the security data together with a value of a security tag when the security data is printed.

9. The image forming apparatus of claim 8, wherein the value of the security tag has a unique binary value according to a security level.

10. The image forming apparatus of claim 8, wherein the image forming controller prints the security data in a data area of a print medium and prints the value of the security tag and the IP address information in a security area of the print medium, the security area being located along a periphery of the print medium and closer to an edge of the print medium than the data area.

11. An image forming apparatus in communication with a plurality of host computers through a network, comprising:

a storage configured to store control programs to control the image forming apparatus, IP Address information of each of the plurality of host computers, and data transmitted by each of the plurality of host computers;

a security setting unit configured to create security data by adding a security tag to the transmitted data, the security tag including transmission prohibiting information, preventing transmission of corresponding data to a non-authorized host computer and security level information indicating a security level; and an image forming controller configured to receive the data and the IP address information of the host computers and to store the data and the IP address information in the storage, and to manage the stored data when a request is received from a host computer based on a comparison of an IP address information of the requesting host computer and the IP address information stored which is associated with the particular data requested to be managed.

12. The image forming apparatus of claim 11, wherein the security tag is added in response to a security setting command input by a user on an input unit of one of the plurality of host computers.

13. The image forming apparatus of claim 11, wherein when a request to delete particular data is received from a host computer, the image forming controller manages the stored data such that the stored data is deleted only if the IP address information of the requesting host computer matches an IP address information stored which is associated with the particular data to be deleted.

14. The image forming apparatus of claim 11, wherein when a request to print particular data is received from a host computer, the image forming controller manages the stored data such that the stored data is printed only if the IP address information of the requesting host computer matches an IP address information stored which is associated with the particular data to be printed.

15. The image forming apparatus of claim 11, wherein when a request to transmit particular data thereto is received from a host computer, the image forming controller manages the stored data such that the stored data is transmitted only if the IP address information of the requesting host computer matches an IP address information stored which is associated with the particular data to be transmitted.

16. A method of creating security print data for an image forming apparatus, comprising:

transmitting print data from a host computer to the image forming apparatus;

storing the transmitted print data in the image forming apparatus; and associating security information with the stored print data in the image forming apparatus at the image forming apparatus, wherein the associated security information includes an IP address of the host computer and a security tag including transmission prohibiting information, preventing transmission of corresponding data to a non-authorized host computer and security level information indicating a security level.

17. The method of claim 16, further comprising:

printing the stored print data with the associated security information.

18. The method of claim 17, wherein the print data is printed in a data area of a printing medium and the associated security information is printed in a security area of the printing medium.

19. The method of claim 16, further comprising:

deleting the stored print data and the associated security information.

20. The method of claim 16, wherein the associated security information includes a security tag associated with the IP address.

21. The method of claim 16, wherein the host computer and the image forming apparatus are connected through a network.

22. An image forming apparatus to communicate with a plurality of host computers through a network, the image forming apparatus comprising:
- a security setting unit configured to perform a security setting of received data; and
- an image forming controller configured to receive data transmitted from the respective plurality of host computers and to store the received data together with a corresponding IP address of the host computer which sends the data, and to control the security setting unit to perform the security setting according to a security setting command input by a user by adding a security tag to the data that includes transmission prohibiting information, preventing transmission of corresponding data to a non-authorized host computer and security level information indicating a security level.

23. The apparatus of claim 22, further comprising:
a storage unit configured to store the received data together with the corresponding IP address of the host computer which sends the data by the control of the image forming controller.

* * * * *